US009923679B2

(12) United States Patent
Huang et al.

(10) Patent No.: US 9,923,679 B2
(45) Date of Patent: Mar. 20, 2018

(54) HIGH-EFFICIENCY WI-FI (HEW) STATION, ACCESS POINT, AND METHODS FOR RANDOM ACCESS CONTENTION

(71) Applicant: Intel IP Corporation, Santa Clara, CA (US)

(72) Inventors: Po-Kai Huang, West Lafayette, IN (US); Chittabrata Ghosh, Fremont, CA (US); Shahrnaz Azizi, Cupertino, CA (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 113 days.

(21) Appl. No.: 14/668,388

(22) Filed: Mar. 25, 2015

(65) Prior Publication Data
US 2016/0286548 A1 Sep. 29, 2016

(51) Int. Cl.
*H04L 5/00* (2006.01)
*H04W 74/08* (2009.01)
*H04W 84/12* (2009.01)

(52) U.S. Cl.
CPC ....... *H04L 5/0007* (2013.01); *H04W 74/0808* (2013.01); *H04W 84/12* (2013.01)

(58) Field of Classification Search
CPC .................. H04W 72/0446; H04L 5/0007
See application file for complete search history.

(56) References Cited

U.S. PATENT DOCUMENTS

| 8,619,753 | B1 * | 12/2013 | Liu | .................. | H04W 72/1257 370/322 |
|---|---|---|---|---|---|
| 2012/0063364 | A1 | 3/2012 | Emmelmann et al. | | |
| 2013/0051358 | A1 | 2/2013 | Turtinen et al. | | |
| 2015/0016435 | A1 | 1/2015 | Hedayat | | |

(Continued)

FOREIGN PATENT DOCUMENTS

| WO | WO-2013191470 A1 | 12/2013 |
|---|---|---|
| WO | WO-2016153594 A1 | 9/2016 |

OTHER PUBLICATIONS

"International Application Serial No. PCT/US2016/014885, International Search Report dated May 24, 2016", 3 pgs.

(Continued)

*Primary Examiner* — Jackie Zuniga Abad
(74) *Attorney, Agent, or Firm* — Schwegman Lundberg & Woessner, P.A.

(57) ABSTRACT

Embodiments of a high-efficiency Wi-Fi (HEW) station, access point (AP), and method for communication in a wireless network are generally described herein. In some embodiments, the HEW station may perform random access contention with other HEW stations for uplink resources for data transmission to the HEW AP. The HEW station may determine transmission activity during a first portion of a channel sensing period, and may select a sub-channel on which transmission activity is not determined. The HEW station may transmit an announcement signal on the selected sub-channel during a second portion of the channel sensing period. The announcement signal transmission may indicate, to other contending HEW stations, an intention by the HEW station to transmit on the same selected sub-channel during a subsequent access period.

26 Claims, 6 Drawing Sheets

(56) References Cited

U.S. PATENT DOCUMENTS

2016/0128024 A1* 5/2016 Frederiks .............. H04W 72/04
370/329
2016/0165589 A1* 6/2016 Chu ...................... H04L 5/0007
370/329

OTHER PUBLICATIONS

"International Application Serial No. PCT/US2016/014885, Written Opinion dated May 24, 2016", 5 pgs.
Kun, Tan, et al., "Fine-grained Channel Access in Wireless LAN", ACM SIGCOMM 2010 conference, (Oct. 2010), 147-158.

* cited by examiner

HIGH-EFFICIENCY WI-FI (HEW) STATION, ACCESS POINT, AND METHODS FOR RANDOM ACCESS CONTENTION

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax SIG (named DensiFi). Some embodiments relate to high-efficiency (HE) wireless or high-efficiency WLAN (HEW) communications. Some embodiments relate to multi-user (MU) multiple-input multiple-output (MIMO) communications and orthogonal frequency division multiple access (OFDMA) communication techniques. Some embodiments relate to random access contention techniques.

BACKGROUND

Wireless communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). A recently-formed study group for Wi-Fi evolution referred to as the IEEE 802.11 High Efficiency WLAN (HEW) study group (SG) (i.e., IEEE 802.11ax) is addressing these high-density deployment scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
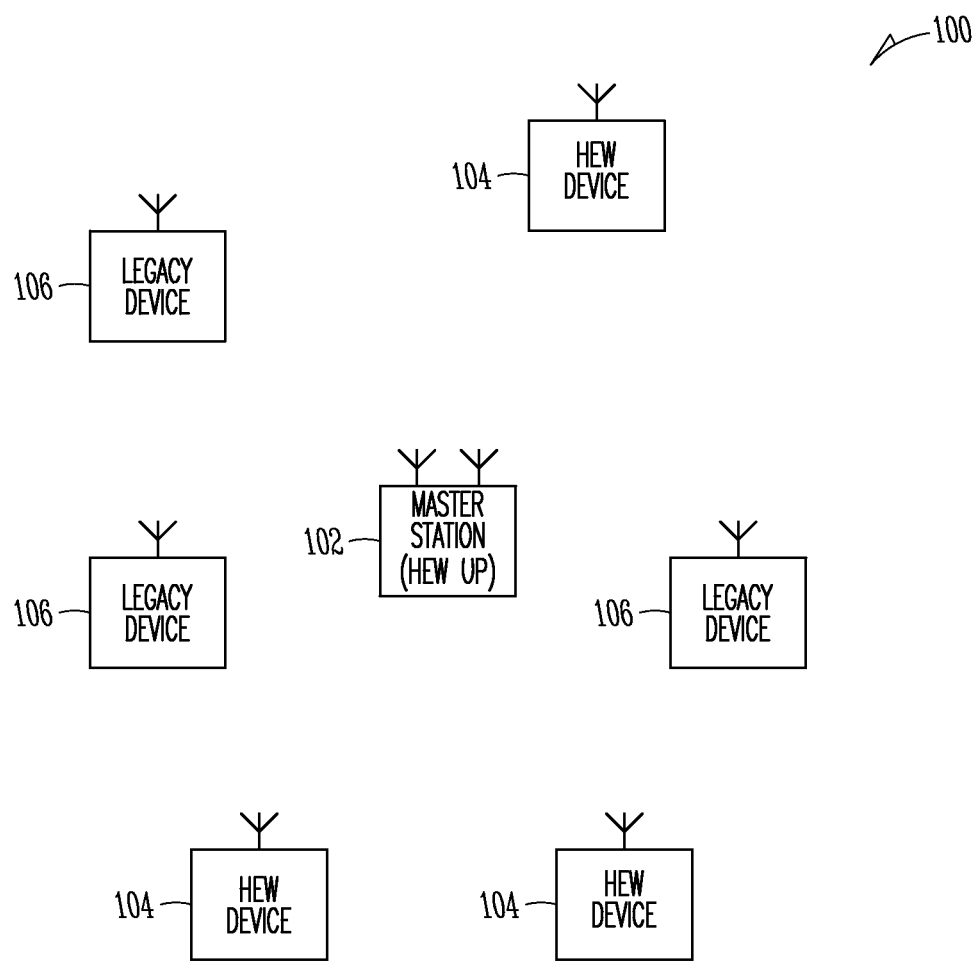
FIG. 1 illustrates a High Efficiency Wi-Fi (HEW) network in accordance with some embodiments.

FIG. 1 illustrates a High Efficiency (HE) Wi-Fi (HEW) network in accordance with some embodiments. HEW network 100 may include a master station (STA) 102, a plurality of HEW stations 104 (HEW devices), and a plurality of legacy stations 106 (legacy devices). The master station 102 may be arranged to communicate with the HEW stations 104 and the legacy stations 106 in accordance with one or more of the IEEE 802.11 standards. In accordance with some HEW embodiments, an access point may operate as the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 using one or more HEW frames. During the HEW control period, legacy stations 106 may refrain from communicating. In some embodiments, the master-sync transmission may be referred to as a control and schedule transmission.

In some embodiments, the HEW station 104 may transmit announcement signals that may indicate, to other contending HEW stations 104, an intention to transmit on a particular sub-channel during a subsequent access period. The HEW station 104 may transmit an access signal during the access period for reception at the AP 102. The access signal may indicate a request by the HEW station 104 for data transmission resources to transmit data signals to the AP 102 during the data transmission period. These embodiments will be described below.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HEW control period may be configured for uplink or downlink data communications.

The master station 102 may also communicate with legacy stations 106 in accordance with legacy IEEE 802.11 communication techniques. In some embodiments, the master station 102 may also be configurable communicate with the HEW stations 104 outside the HEW control period in accordance with legacy IEEE 802.11 communication techniques, although this is not a requirement.

In some embodiments, the HEW communications during the control period may be configurable to have bandwidths of one of 20 MHz, 40 MHz, or 80 MHz contiguous bandwidths or an 80+80 MHz (160 MHz) non-contiguous bandwidth. In some embodiments, a 320 MHz channel width may be used. In some embodiments, subchannel bandwidths less than 20 MHz may also be used. In these embodiments, each channel or subchannel of an HEW communication may be configured for transmitting a number of spatial streams.

In accordance with embodiments, a HE station (master station 102, HEW stations 104) may generate a HE packet in accordance with a short preamble format or a long preamble format. The HE packet may comprise a legacy signal field (L-SIG) followed by one or more HE signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below.

Figure 2:
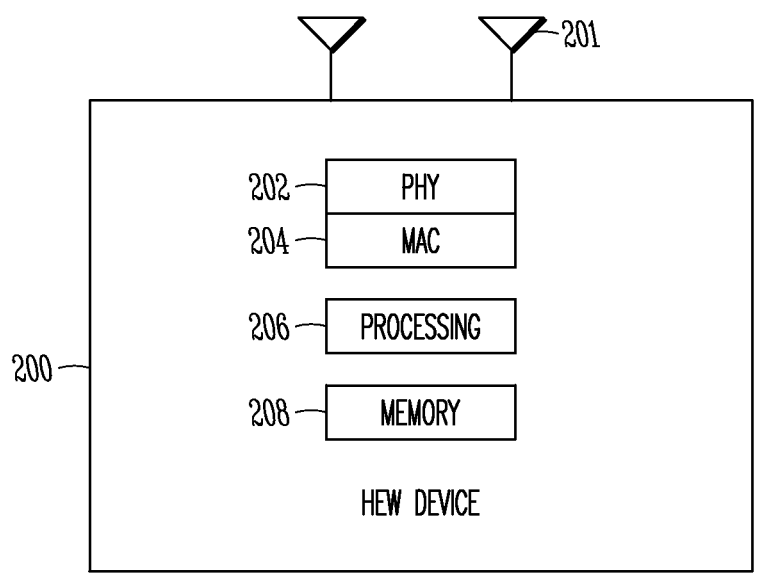
FIG. 2 illustrates an HEW device in accordance with some embodiments.

FIG. 2 illustrates an HEW device in accordance with some embodiments. HEW device 200 may be an HEW compliant device that may be arranged to communicate with one or more other HEW devices, such as HEW stations and/or a master station, as well as communicate with legacy devices. HEW device 200 may be suitable for operating as master station or an HEW station. In accordance with embodiments, HEW device 200 may include, among other things, physical layer (PHY) circuitry 202 and medium-access control layer circuitry (MAC) 204. PHY 202 and MAC 204 may be HEW compliant layers and may also be compliant with one or more legacy IEEE 802.11 standards. PHY 202 may be arranged to transmit HEW frames. HEW device 200 may also include other processing circuitry 206 and memory 208 configured to perform the various operations described herein.

In accordance with some embodiments, the MAC 204 may be arranged to contend for a wireless medium during a contention period to receive control of the medium for the HEW control period and configure an HEW frame. The PHY 202 may be arranged to transmit the HEW frame as discussed above. The PHY 202 may also be arranged to receive an HEW frame from HEW stations. MAC 204 may also be arranged to perform transmitting and receiving operations through the PHY 202. The PHY 202 may include circuitry for modulation/demodulation, upconversion and/or downconversion, filtering, amplification, etc. In some embodiments, the processing circuitry 206 may include one or more processors. In some embodiments, two or more antennas may be coupled to the physical layer circuitry arranged for sending and receiving signals including transmission of the HEW frame. The memory 208 may be store information for configuring the processing circuitry 206 to perform operations for configuring and transmitting HEW frames and performing the various operations described herein.

In some embodiments, the HEW device 200 may be configured to communicate using OFDM communication signals over a multicarrier communication channel. In some embodiments, HEW device 200 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the invention is not limited in this respect as they may also be suitable to transmit and/or receive communications in accordance with other techniques and standards. In some other embodiments, HEW device 200 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, HEW device 200 may be part of a portable wireless communication device, such as a personal digital assistant (PDA), a laptop or portable computer with wireless communication capability, a web tablet, a wireless telephone or smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, HEW device 200 may include one or more of a keyboard, a display, a non-volatile memory port, multiple antennas, a graphics processor, an application processor, speakers, and other mobile device elements. The display may be an LCD screen including a touch screen.

The antennas 201 of HEW device 200 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201 may be effectively separated to take advantage of spatial diversity and the different channel characteristics that may result between each of antennas and the antennas of a transmitting station.

Although HEW device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of HEW device 200 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Embodiments disclosed herein provide two preamble formats for High Efficiency (HE) Wireless LAN standards specification that is under development in the IEEE Task Group 11ax (TGax).

In accordance with embodiments, the HEW station 104 may perform random access contention with other HEW stations 104 for uplink resources for data transmission to the HEW AP 102. The HEW station 104 may determine transmission activity during a first portion of a channel sensing period, and may select a sub-channel on which transmission activity is not determined. The HEW station 104 may transmit an announcement signal on the selected sub-channel during a second portion of the channel sensing period. The announcement signal transmission may indicate, to other contending HEW stations 104, an intention by the HEW station 104 to transmit on the same selected sub-channel during a subsequent access period. These embodiments will be described in more detail below.

Figure 3:
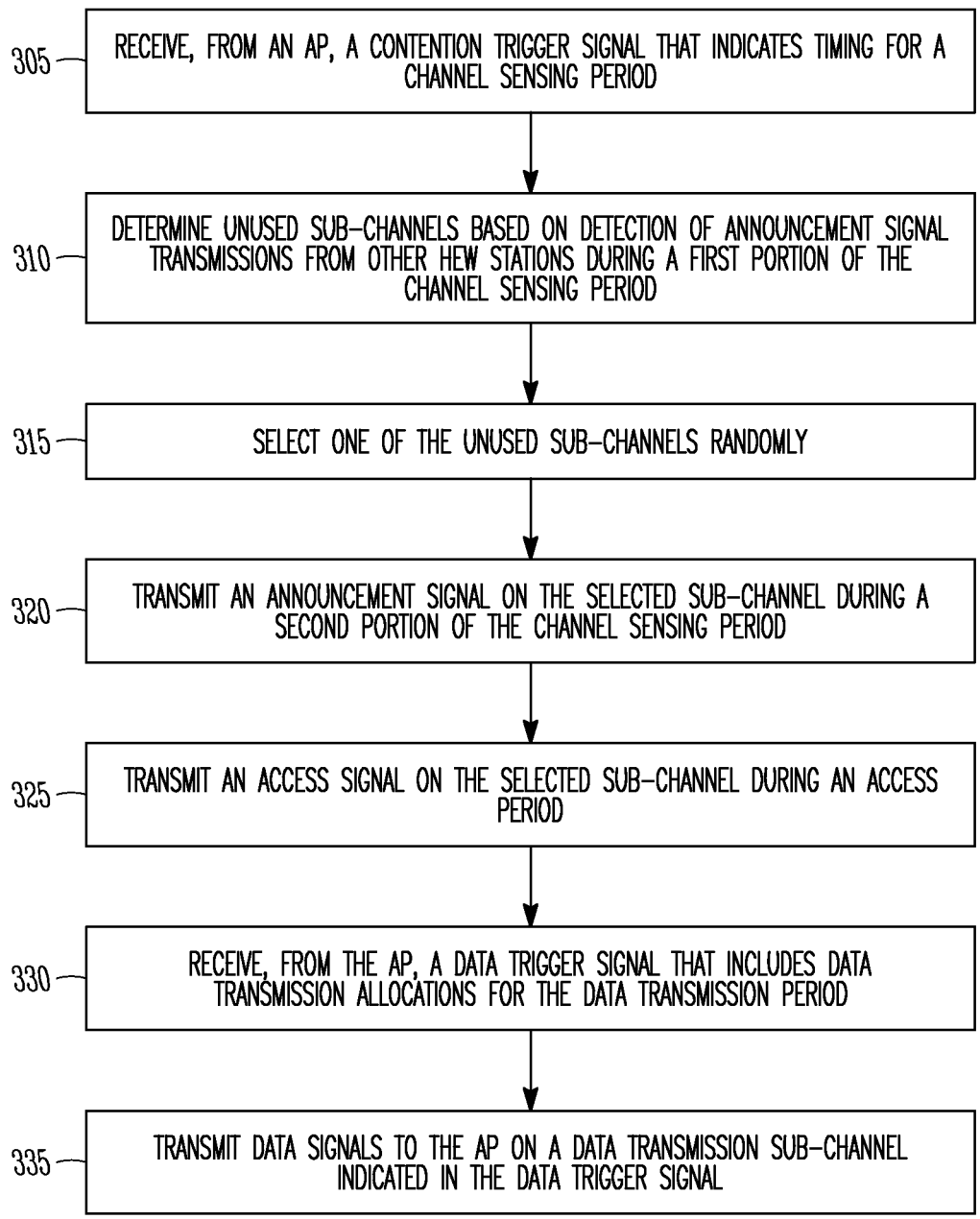
FIG. 3 illustrates the operation of a method of uplink random access contention in accordance with some embodiments.

FIG. 3 illustrates the operation of a method of uplink random access contention in accordance with some embodiments. It is important to note that embodiments of the method 300 may include additional or even fewer operations or processes in comparison to what is illustrated in FIG. 3. In addition, embodiments of the method 300 are not necessarily limited to the chronological order that is shown in FIG. 3. In describing the method 300, reference may be made to FIGS. 1-2 and 4-6, although it is understood that the method 300 may be practiced with any other suitable systems, interfaces and components.

In addition, while the method 300 and other methods described herein may refer to HEW stations 104 or APs 102 operating in accordance with 802.11 or other standards, embodiments of those methods are not limited to just those HEW stations 104 or APs 102 and may also be practiced on other mobile devices, such as a user station (STA), an Evolved Node-B (eNB) or User Equipment (UE). The method 300 and other methods described herein may also be practiced by wireless devices configured to operate in other suitable types of wireless communication systems, including systems configured to operate according to various Third Generation Partnership Project (3GPP) Long Term Evolution (LTE) standards.

At operation 305 of the method 300, the HEW station 104 may receive, from the AP 102, a contention trigger signal. The contention trigger signal may indicate timing to be used by the HEW station 104 and other HEW stations 104 as part of the random access contention. As will be explained below, the timing may related to a channel sensing period, an access period, or another period or event in the random access contention. The channel sensing period and the access period may be allocated for resource contention by HEW stations 104 for data transmissions to the AP 102 on a group of sub-channels during a data transmission period.

In some embodiments, the sub-channels may comprise a predetermined bandwidth. As an example, a channel of 20 MHz may be divided into 8 sub-channels of 2.5 MHz bandwidth each. As another example, the 20 MHz channel may include 8 or 9 sub-channels of 2.03125 MHz bandwidth each. These examples are not limiting, however, as other suitable values for the bandwidth and the number of sub-channels per channel may be used.

In some embodiments, the sub-channels may comprise multiple sub-carriers. As an example, each sub-channel may include a group of contiguous sub-carriers spaced apart by a pre-determined sub-carrier spacing. As another example, each sub-channel may include a group of non-contiguous sub-carriers. That is, the channel may be divided into a set of contiguous sub-carriers spaced apart by the pre-determined sub-carrier spacing, and each sub-channel may include a distributed or interleaved subset of those sub-carriers. The sub-carrier spacing may take a value such as 78.125 kHz, 312.5 kHz or 15 kHz, although these example values are not limiting. Other suitable values that may or may not be part of an 802.11 or 3GPP standard or other standard may also be used in some cases.

In some embodiments, the contention trigger signal may include a predetermined signal or pattern that may enable the HEW station 104 to determine a reference time. As an example, the HEW station 104 may further use the reference time to determine a starting time for the channel sensing period, access period or other period by adding a predefined time offset to the determined reference time. The predefined time offsets may be known by the AP 102 and the HEW stations 104 as part of a protocol such as 802.11ax or other. In some embodiments, the contention trigger signal may include timing information or other information as part of a data block. These embodiments are not limiting, however, as the contention trigger may indicate timing for the random access contention to the HEW stations 104 in any suitable manner.

Figure 4:
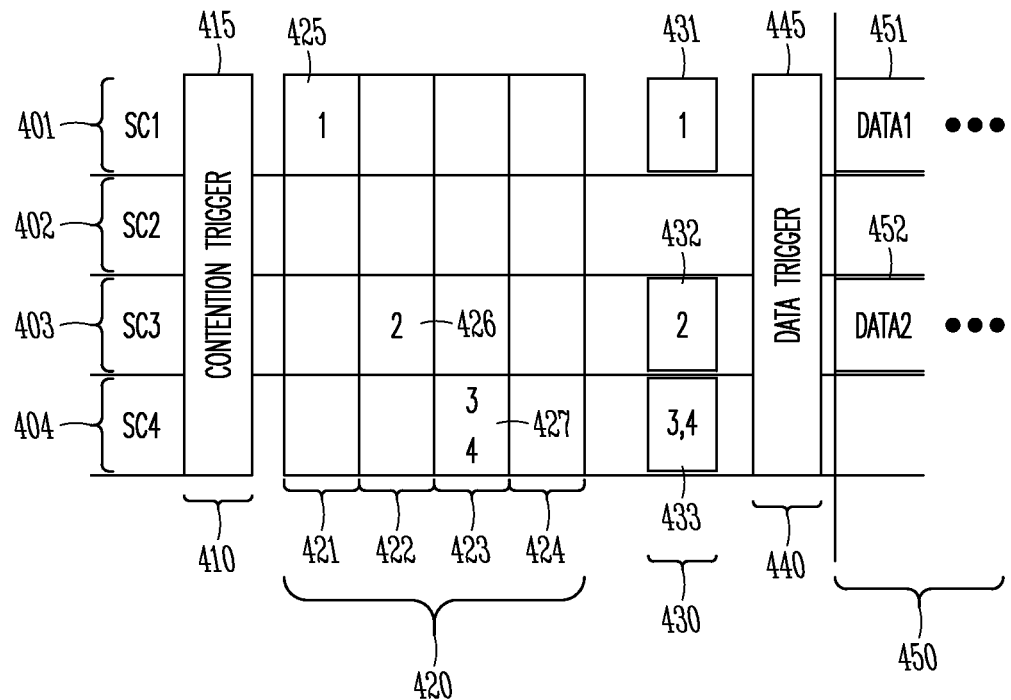
FIG. 4 illustrates an example of a random access contention between multiple HEW stations and an AP in accordance with some embodiments.
Figure 4:
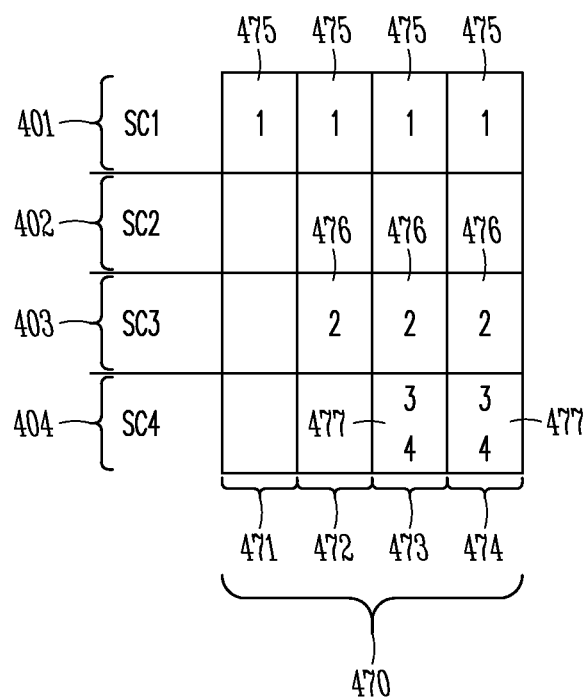

FIG. 4 illustrates an example of a random access contention between multiple HEW stations and an AP in accordance with some embodiments. It should be noted that the example of random access contention 400 shown in FIG. 4 may serve to illustrate some concepts and techniques that may be included in some embodiments, but the example is not limiting. Accordingly, embodiments are not limited to what is shown in FIG. 4 in terms of chronological order, timing, and sub-channel allocation for transmission and/or reception of the signals shown. Some embodiments may include usage of some or all of the signals shown, and some embodiments may include usage of additional signals not shown in FIG. 4. In addition, the number of sub-channels and the number of HEW stations 104 used in the example is also not limiting.

The HEW stations 104 may content for random access using the four sub-channels 401-404, as shown in FIG. 4. As previously described, the HEW stations 104 and the AP 102 may use a common frequency band (a system frequency band) for transmission and reception of signals, although not limited as such. The contention trigger signal 415 may be transmitted during a contention trigger period 410, and may use an orthogonal frequency division multiplexing (OFDM) signal that spans the four sub-channels 401-404 labeled as "SC1"-"SC4." That is, the contention trigger signal 415 may be considered an OFDM signal that spans the system frequency band.

Returning to the method 300, operations 310-320 may be included as part of a time and frequency contention process that occurs during a channel sensing period. At operation 310, unused sub-channels may be determined based on detection of announcement signal transmissions from other HEW stations during a first portion of the channel sensing period. At operation 315, one of the unused sub-channels may be selected randomly. The random selection may include uniform selection in which each of the unused sub-channels is selected with equal probability. An announcement signal may be transmitted on the selected sub-channel during a second portion of the channel sensing period at operation 320. It should be pointed out that some embodiments of the method 300 may not include all of the operations 310-320 and some embodiments may not even include the time and frequency contention process.

As will be described below, the HEW station 104 may perform channel sensing during the first portion and may transmit announcement signals during the second portion. An announcement signal transmission on a particular sub-channel may be performed by a first HEW station 104 to indicate, to other HEW stations 104, an intention by the first HEW station 104 to transmit on that same sub-channel during the subsequent access period. The channel sensing performed during the first portion may include detection of announcement signal transmissions from other HEW stations 104.

During the first portion of the channel sensing period, transmission activity may be determined for a group of sub-channels, which may or may not comprise the system frequency band. In some embodiments, individual determinations of transmission activity may be performed for some or all of the sub-channels in the group. As part of the determination of the transmission activity, detection of announcement signal transmissions from one or more other contending HEW stations 104 may be performed for the first portion.

During the second portion of the channel sensing period, the announcement signal may be transmitted by the HEW station 104 on a sub-channel that is selected based at least partly on the transmission activity determined for the first portion. In some embodiments, the sub-channel may be selected randomly from one or more sub-channels of the group of sub-channels on which transmission activity is not detected during the first portion. That is, a group of unused sub-channels may be determined based on transmission activity in the first portion, and one of those unused sub-channels may be selected for transmission of the announcement signal. The random selection may include uniform selection in which each of the unused sub-channels is selected with equal probability.

In some embodiments, the channel sensing period may be divided into multiple time slots and the first and second portions of the channel sensing period may include one or more time slots. As part of the time and frequency contention process, the HEW station 104 may randomly select a transmission time slot on which to transmit or to begin transmission of an announcement signal. The random selection may include uniform selection in which each of the multiple time slots is selected as the transmission time slot with equal probability. The first portion may include one or more of the time slots in the channel sensing period that occur before the transmission time slot. The second portion may include the transmission time slot and may or may not include one or more subsequent time slots of the channel sensing period. It should be pointed out that in some cases, the HEW station 104 may select the initial time slot of the channel sensing period as the transmission time slot. In such cases, operation 310 may be excluded and the first portion may be considered non-existent.

Several non-limiting examples of the first and second portions are given below. As a first example, the first portion may include all of the time slots in the channel sensing period prior to the transmission time slot and the second portion may include the transmission time slot. As another example, the first portion may include all of the time slots in the channel sensing period prior to the transmission time slot and the second portion may include the transmission time slot and all subsequent time slots in the channel sensing period. In this case, the first and second portions may span the channel sensing period. As another example, the first portion may include a single time slot immediately preceding the transmission time slot and the second portion may include the transmission time slot and all subsequent time slots in the channel sensing period. These examples of the first and second portions are presented for illustration of concepts, but the scope of embodiments is not limited in this respect.

Referring back to the example of random access contention 400 in FIG. 4, the time and frequency contention process described above may be performed during the channel sensing period 420, which may include or be divided into multiple time slots 421-424. Although four time slots 421-424 are shown in FIG. 4, embodiments are not limited to this number. In the example shown, the four HEW stations 104 (referred to as HEW stations #1, #2, #3, and #4) may each randomly select a time slot from 421-424 for transmission of an announcement signal. The random selection may include uniform selection as previously described.

The first HEW station 104 (HEW station #1) may perform an announcement signal transmission in sub-channel 401 during the time slot 421, as shown by the "1" label in the box 425.

The second HEW station 104 (HEW station #2) may select the second time slot 422 for an announcement signal transmission and may perform channel sensing during the first time slot 421 to determine which sub-channels of 401-404 are already used or reserved. As HEW station #1 has used the first sub-channel 401 during time slot 421, HEW station #2 may determine that the first sub-channel 401 is unavailable and may randomly select one of the remaining (or unused) sub-channels 402-404 for transmission of the announcement signal. In the example shown, the HEW station #2 selects the third sub-channel 403 for its transmission during time slot 422, as shown by the label "2" in the box 426. As previously described, for HEW station #2, the first portion may be time slot 421 and the second portion may be time slot 422.

The third and fourth HEW stations 104 (HEW station #3 and #4) may both select the third time slot 423 for announcement signal transmissions and may perform channel sensing during the time slots 421-422 to determine which sub-channels of 401-404 are already used or reserved. As HEW station #1 has used the first sub-channel 401 during time slot 421 and HEW station #2 has used the third sub-channel 403 during time slot 422, HEW stations #3 and #4 may determine that sub-channels 401 and 403 are unavailable. Each of HEW station #3 and #4 may randomly select one of the remaining (or unused) sub-channels 402, 404 for transmission of the announcement signal during time slot 423. In the example shown, both of HEW stations #3 and #4 select the fourth sub-channel 404 for transmission during time slot 423, as shown by the labels "3" and "4" in the box 427. As previously described, for HEW stations #3 and #4, the first portion may be time slots 421-422 and the second portion may be time slot 423.

As this example demonstrates, the fact that sub-channels 402 and 404 were "unused" during time slots 421-422 does not guarantee that they will be available or contention free during subsequent time slots. That is, a collision between HEW stations #3 and #4 may occur. This example also demonstrates that the first and second portions may be variable length. That is, a selected time slot for the announcement signal transmission may map to a set of lengths for the first and second portions, and different selections may produce different sets of lengths. For instance, the first portion for HEW station #2 includes one time slot 421 while the first portion for HEW station #3 includes two time slots 421, 422.

Referring again to FIG. 4, another example channel sensing window 470 is shown to illustrate other techniques that may be performed in operations 310-320 as part of the time and frequency contention process previously described. Some or all of these techniques described for the channel sensing window 470 may be performed instead of, or in addition to, techniques previously described regarding the channel sensing period 420. In some cases, the arrangement shown for the channel sensing period 470 may be used to produce the same results, or similar results, that may result when the channel sensing period 420 is used. Accordingly, various trade-offs for each arrangement may be considered.

In the example, the HEW station #1 selects the sub-channel 401 for transmission of the announcement signal starting at the first time slot 471. The transmission is performed not only in time slot 471, but also in each of the remaining time slots 472-474 of the channel sensing period 470. Similarly, the HEW station #2 selects sub-channel 403 for transmission of an announcement signal starting at slot 472. The selection of sub-channel 403 may be based on the detected transmission activity on sub-channel 401 during time slot 471. The transmission is performed by HEW station #2 not only in time slot 472, but also in each of the remaining time slots 473-474 of the channel sensing period 470.

The HEW stations #3 and #4 may select sub-channel 404 for transmissions of announcement signals starting at slot 473. The selections of sub-channel 404 may be based on the detected transmission activity on sub-channels 401 and 403 during previous time slots 471-472. It should be noted that in this arrangement, HEW stations #3 and #4 may be able to detect the transmission activity of HEW station #1 by performing channel sensing only during time slot 472 without the need for channel sensing during time slot 471. In comparison, when the arrangement shown for the channel sensing window 420 is used, HEW stations #3 and #4 may need to perform channel sensing in all time slots prior to the time slot 473 in which they have selected for transmission.

Accordingly, in some embodiments, the first portion of the channel sensing period, in which an HEW station 104 determines transmission activity, may be restricted to the single time slot immediately prior to the time slot selected for transmission of the announcement signal by the HEW station 104. This may be possible when the HEW stations 104 transmit their announcement signals not only in the selected time slot for transmission, but in all remaining time slots in the channel sensing window. Thus, the second portion of the channel sensing period may include a contiguous group of time slots in which a starting time slot of the second portion immediately follows the final time slot of the first portion. In addition, a final time slot of the second portion may be a final time slot of the channel sensing period. As previously described, the starting time slot of the second portion may be selected randomly from the time slots included in the channel sensing period. The random selection may include uniform selection as previously described.

A benefit may be realized, in some cases, when the HEW station 104 only needs to perform the channel sensing during a single time slot. That is, the HEW station 104 may be able to remain in a sleep mode or power saving mode or similar until the time slot immediately prior to the time slot selected for transmission by the HEW station 104.

In some embodiments, the announcement signal may include a short training field (STF) and/or a long training field (LTF), which may be included in one or more 802.11ax or other 802.11 or other standards. These embodiments are not limiting, however, and any suitable signal, pattern or data block may be included in the announcement signal instead of, or in addition to, the STF and LTF. For example, a signal using random data may be used. The signal may be an orthogonal frequency division multiple-access (OFDMA) signal in some cases, although the scope of embodiments is not limited in this respect. As previously described, the announcement signal on a particular sub-channel may enable other HEW stations 104 to determine that the particular sub-channel is unavailable. As such, in some cases, the contents of the signal (such as data bits) may not be important. In addition, when the announcement signal is transmitted during multiple time slots (as in the channel sensing window 470 of FIG. 4), various arrangements may be used. As an example, the same announcement signal may be repeated in each of the time slots. As another example, different announcement signals may be transmitted in the time slots. As another example, longer announcement signals that span multiple time slots may be used.

In some embodiments, the announcement signal may exclude identifiers of the transmitting HEW station 104. In addition, other signals, data, and preambles that may be included in some 802.11ax signals or packets may be excluded from the announcement signal. As such, the announcement signal may be shortened in comparison to other signals, which may enable reduction of the channel sensing period.

In some embodiments, the detection may be performed for each of the OFDMA sub-channels in the group of sub-channels. Techniques such as energy detection or power detection may be used, and may be performed on individual sub-channels in some cases. The unused sub-channels may be determined as those on which transmission activity, such as announcement signal transmissions, is not determined during the first portion. Accordingly, one or more sub-channels may be determined to be already used or occupied by one or more HEW stations 104 and the remaining sub-channels in the group of all sub-channels in the system frequency band may be determined to be unused.

It should be noted that when multiple announcement signals are transmitted on a particular sub-channel during an overlapping time period by other contending HEW stations 104, the HEW station 104 may not necessarily be able to distinguish how many signals are transmitted. However, such information may not be necessary, as the HEW station 104 may only need to determine that "at least one" signal is transmitted on that sub-channel in order to determine that there is transmission activity on that sub-channel.

Returning to the method 300, at operation 325, an access signal may be transmitted by the HEW station 104 during an access period on the same sub-channel selected for the transmission of the announcement signal. In some embodiments, the access signal may include or may be part of one or more orthogonal frequency division multiple access (OFDMA) signals. These embodiments are not limiting, however, as other types of signals may also be used.

In some embodiments, the transmission of the access signal may indicate, to the AP 102, a request by the HEW station 104 for data transmission resources during a data transmission period. In some embodiments, the access signal may include an identifier of the HEW station, such as a station ID. The identifier may be transmitted as part of a data block or data packet, and may also include one or more of an STF, LTF, HEW preamble or other data or signals.

Accordingly, the access signal may be longer than the announcement signal, and may be significantly longer in some cases. As an example, each time slot of the channel sensing period may span a time duration that is less than ten percent of a time duration spanned by the access period. This example is not limiting, however, and the time slot may span any suitable percentage of the access period. For instance, values such as 1%, 2%, 10%, 25% or other suitable values may be used.

Referring back to the example of random access contention 400 in FIG. 4, the HEW station #1 may transmit an access signal during the access period 430 in sub-channel 401, as indicated by the label of "1" in box 431. Similarly, the HEW station #2 may transmit an access signal during the access period 430 in sub-channel 403, as indicated by the label of "2" in box 432. The HEW stations #3 and #4 may transmit access signals during the access period 430 in sub-channel 404, as indicated by the labels of "3" and "4" in box 433. As such, all of the HEW stations #1-#4 may transmit the access signal in the same sub-channel used for announcement signal transmission. As indicated earlier, the access signals transmitted by HEW stations #3 and #4 in the same sub-channel may collide.

At operation 330, a data trigger signal may be received from the AP 102, and may include data transmission allocations for the data transmission period. At operation 335, data signals may be transmitted to the AP 102 according to the data transmission allocations included in the data trigger signal. That is, data signals may be transmitted to the AP on one or more data transmission sub-channels indicated in the data trigger signal. In some embodiments, the data signals may include or may be part of one or more orthogonal frequency division multiple access (OFDMA) signals. These embodiments are not limiting, however, as other types of signals may also be used.

The AP 102 may perform contention resolution based on access signals received during the access period, which may be reflected in the assignment of the data allocations in the data trigger signal. In some cases, multiple sub-channels may be allocated to an HEW station 104 for data transmission, although the access signal may be transmitted on just a single sub-channel. The assignment of sub-channels for the data transmission may or may not be related to the sub-channel on which the access signals are transmitted. In some cases, data signals may be transmitted on a sub-channel different from the sub-channel used for transmission of the announcement signal.

Referring to the example of random access contention 400 in FIG. 4, the data trigger signal 445 may be transmitted by the AP 102 during the data trigger period 440. The HEW station #1 may be allocated sub-channel 401 for data transmission during the data transmission period 450, as indicated by the label "Data 1" in box 451. The HEW station #2 may be allocated sub-channel 403 for data transmission during the data transmission period 450, as indicated by the label "Data 2" in box 452. Because the access transmissions from the HEW stations #3 and #4 may have collided at the AP 102, the AP 102 may not allocate any data transmission resources to either or HEW stations #3 or #4. In some cases, the AP 102 may not be able to decode the received access signals to determine information like the HEW identifier, and therefore may not even know the identities of these HEW stations 104. It should be noted that data resources may be assigned for OFDMA sub-channels 402 and 404, although not shown as such in the example of FIG. 4. That is, either of HEW station #1 or #2 could be allocated additional sub-channels in some cases. The number of sub-channels allocated to the HEW stations 104 may be based on how much data needs to be transmitted or other factors.

Figure 5:
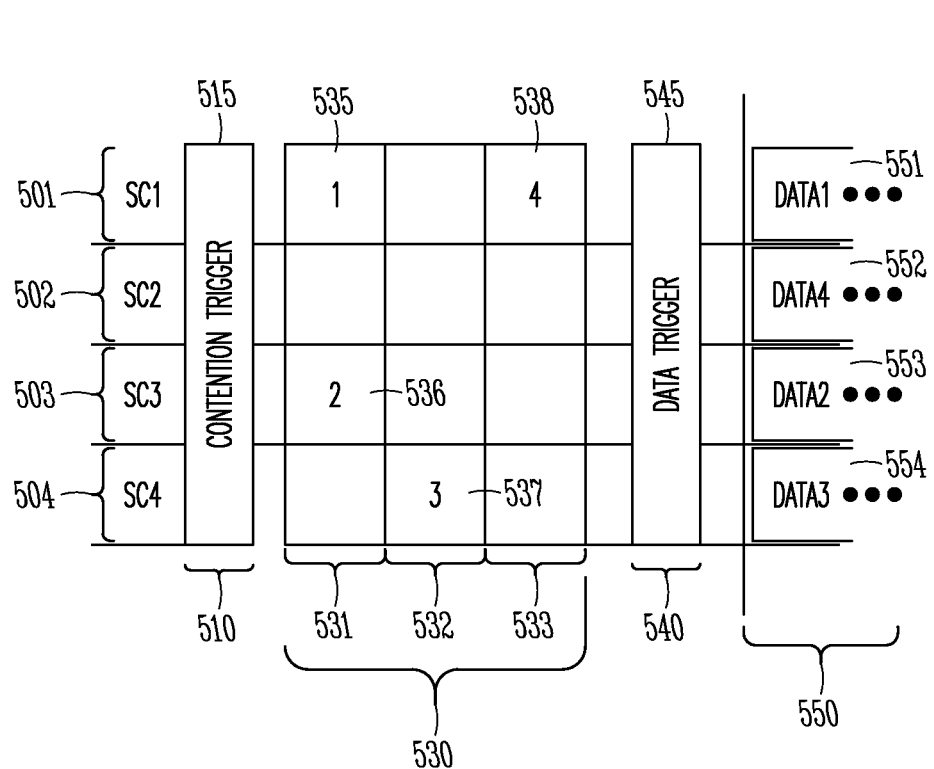
FIG. 5 illustrates another example of a random access contention between multiple HEW stations and an AP in accordance with some embodiments.

FIG. 5 illustrates another example of a random access contention between multiple HEW stations and an AP in accordance with some embodiments. It should be noted that the example of random access contention 500 shown in FIG. 5 may serve to illustrate concepts, but embodiments are not limited to what is shown in FIG. 5 in terms of chronological order, timing, sub-channel allocations, and signals shown, and some embodiments may include usage of additional signals not shown in FIG. 5. In addition, the number of sub-channels and the number of HEW stations 104 used in the example is also not limiting.

The contention trigger signal 515 may be transmitted during the contention trigger period 510 as part of an OFDM signal that spans sub-channels 501-504. In this example, a channel sensing period is not used, and therefore the contention trigger signal 515 may indicate timing for the access period 530. The access period 530 may include multiple time slots 531, 532, 533 and is not limited to the number shown in FIG. 5. Each of the time slots 531-533 may be available for transmission of an access signal by an HEW station 104. Accordingly, the HEW stations #1-#4 may randomly select a sub-channel from 501-504 and a time slot from 531-533 for transmission of an access signal. The random selection may include uniform selection as previously described.

In this case, the HEW station #1 transmits an access signal on sub-channel 501 during time slot 531, the HEW station #2 transmits an access signal on sub-channel 503 during time slot 531, the HEW station #3 transmits an access signal on sub-channel 504 during time slot 532, and the HEW station #4 transmits an access signal on sub-channel 501 during time slot 533. The access signals may be similar to or the same as access signals described previously, and may include HEW identifiers. The AP 102 may decode the access signals during each time slot 531-533 on each sub-channel 501-504, and may allocate data transmission resources accordingly. The data trigger signal 545 may be transmitted by the AP 102 during the data trigger period 540 and may include data allocations for the data transmission period 550.

As previously described regarding the example of random access contention 400 (FIG. 4), the assignment of sub-channels for the data transmission may or may not be related to the sub-channel on which the access signals are transmitted. In some cases, data signals may be transmitted on a sub-channel different from the sub-channel used for transmission of the announcement signal. As shown in the example in FIG. 5, the sub-channels 501-504 may be allocated for data transmission during the data transmission period 550 to HEW stations #1, #4, #2, and #3, respectively, as indicated by the labels in boxes 551-554. In addition, some HEW stations 104 may be allocated multiple sub-channels 501-504 for data transmission, although not shown in the example of FIG. 5.

Different arrangements may be compared in terms of overhead and performance. As a first comparison, the arrangement 500 using the multiple time slots 531-533 during the access period 530 may be compared to a similar arrangement 500 in which only a single access time slot (such as 531) is included in the access period 530. In both cases, the channel sensing described in FIG. 4 is excluded. When the three time slots 531-533 are used, 12 access slots are available for transmission of the access signal, as the HEW stations 104 may randomly select one of the four sub-channels 501-504 and one of the three time slots 531-533. The random selection may include uniform selection as previously described. When only a single time slot (such as 531) is available, only 4 access slots are available as the HEW stations 104 may randomly select one of the sub-channels 501-504. The use of multiple time slots 531-533 in comparison to a single time slot may result in better performance in terms of probability of successful contention, average number of successful contentions or other similar performance metric. However, it may be necessary to allocate three times as much time for the access window 530. That is, the duration of time for contention overhead may be three times as long when three access time slots are used.

As a second comparison, the previous example of random access contention 400, in which a single access time slot 430 is used along with a channel sensing period 420, may be compared to the example 500 with either one or three access time slots 531-533. The duration of time for contention overhead for the example 400 may be somewhere in between the two cases described for the example 500. That is, the example 400 includes a single access time slot plus a channel sensing period, which may be reduced in duration through design of the announcement signals, as described earlier. Therefore, in some cases, the duration of time for contention overhead for the example 400 may be slightly longer than that for the example 500 with a single slot (longer by a duration of the channel sensing period 420) but may be significantly shorter than that for the example 500 with multiple slots. In addition, the use of the channel sensing period with multiple time slots (such as 421-424) may provide improved performance over the example 500 with a single slot. For clarity, the time slots 421-424 used in the channel sensing period 400 may be referred to as "channel sensing time slots."

Figure 6:
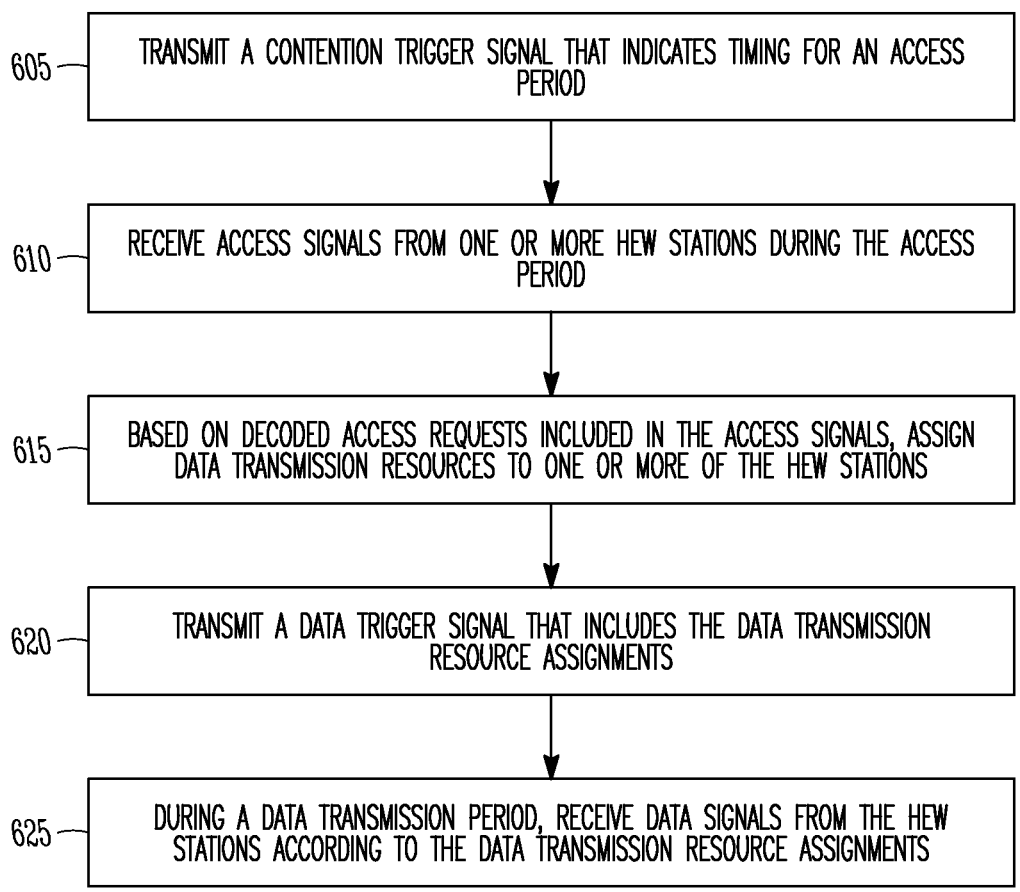
FIG. 6 illustrates the operation of another method of uplink random access contention in accordance with some embodiments.

FIG. 6 illustrates the operation of another method of uplink random access contention in accordance with some embodiments. As mentioned previously regarding the method 300, embodiments of the method 600 may include additional or even fewer operations or processes in comparison to what is illustrated in FIG. 6 and embodiments of the method 600 are not necessarily limited to the chronological order that is shown in FIG. 6. In describing the method 600, reference may be made to FIGS. 1-5, although it is understood that the method 600 may be practiced with any other suitable systems, interfaces and components. In addition, embodiments of the method 600 may refer to eNBs 104, UEs 102, APs, STAs or other wireless or mobile devices.

It should be noted that the method 600 may be practiced at an AP 102, and may include exchanging of signals or messages with HEW stations 104. Similarly, the method 300 may be practiced at the HEW station 104, and may include exchanging of signals or messages with the AP 102. In some cases, operations and techniques described as part of the method 300 may be relevant to the method 600. For instance, an operation of the method 300 may include reception of a block by the HEW station 104 while an operation of the method 600 may include transmission of the same block or similar block by the AP 102. In addition, previous discussion of various concepts may be applicable to the method 600 in some cases, including the contention trigger signal, data trigger signal, access period, access signals, channel sensing period, data transmission period and others.

At operation 605, the HEW AP 102 may transmit a contention trigger signal that indicates timing for an access period for an uplink random access contention by multiple HEW stations 104. In some embodiments, the contention trigger signal may indicate timing for another period associated with the uplink random access contention, such as a channel sensing period. At operation 610, the HEW AP 102 may receive access signals from one or more HEW stations 104 during the access period. The access period may include multiple access time slots, and the HEW AP 102 may attempt to decode an access signal during each access time slot for each sub-channel.

At operation 615, the HEW AP 102 may assign data transmission resources for a data transmission period to one or more of the HEW stations 104. The assignment or allocation of the resources may be based on decoded access requests included in the access signals. That is, the HEW AP 102 may identify the requesting HEW station 104 by the decoded access signal. In addition, the access signal may include other related information such as an indication of how much uplink data needs to be transmitted by the HEW station or a desired data rate for the uplink transmission.

In some cases, data transmission resources allocated to an HEW station 104 may be different from or exclusive to the sub-channel on which the HEW station 104 transmits an access signal. This example is not limiting, however, as the allocated data transmission resources for the HEW station 104 may include the sub-channel used by the HEW station 104 for access signal transmission in some cases.

As an example, the HEW AP 102 may receive a first access signal from a first HEW station 102 during a first access time slot of the access period on a first sub-channel. The HEW AP 102 may receive a second access signal from a second HEW station 102 during a second access time slot of the access period on the same first sub-channel. As the HEW AP 102 may successfully decode both access signals, both the first and second HEW stations 104 may be allocated one or more sub-channels for uplink transmission. The data allocation for the first HEW station 102 may include the first sub-channel, while the data allocation for the second HEW station 102 may exclude the first sub-channel. That is, the second HEW station 102 may be allocated sub-channels different from the one on which it transmits an access signal.

At operation 620, a data trigger signal that includes the data transmission resource assignments may be transmitted by the HEW AP 102. At operation 625, the HEW AP 102 may receive data signals from one or more of the HEW stations 104 according to the data transmission resource assignments.

Referring once again to the non-limiting example in FIG. 5, the HEW AP 102 transmits the contention trigger 515 to indicate a timing of the access period 530, which includes three time slots 531-533. The HEW stations 104 may randomly select an access time slot from 531-533 and a sub-channel from 501-504 for access signal transmission. As shown, HEW stations #1 and #4 both select sub-channel 501, but select different time slots. Therefore, the HEW AP 102 may decode access signals from both HEW stations #1 and #4 and may assign data sub-channels to both. In this case, HEW station #4 is assigned the sub-channel 502 different from the sub-channel 501 used for access signal transmission while HEW station #1 is assigned the same sub-channel 501 that it uses for access signal transmission. It should also be noted that embodiments are not limited to allocation of just a single sub-channel for data transmission.

An example high-efficiency Wi-Fi (HEW) station is disclosed herein. The HEW station may comprise hardware processing circuitry configured to, during a first portion of a channel sensing period, determine transmission activity for a group of sub-channels. The hardware processing circuitry may be further configured to, during a second portion of the channel sensing period, transmit an announcement signal on a sub-channel selected from the group of sub-channels. The selection may be based at least partly on the transmission activity during the first portion. The hardware processing circuitry may be further configured to, during an access period, transmit an access signal on the same sub-channel selected for the transmission of the announcement signal. The access signal may include an identifier of the HEW station. The channel sensing period and the access period may be allocated for resource contention by HEW stations for data transmissions to an access point (AP) on the group of sub-channels during a data transmission period.

In some examples, the sub-channels may comprise a predetermined bandwidth and may further comprise multiple sub-carriers. In some examples, the sub-channel used for the transmission of the announcement signal may be selected randomly from one or more sub-channels of the group of sub-channels on which transmission activity is not detected during the first portion. In some examples, the transmission of the announcement signal on the selected sub-channel may be to indicate, to other HEW stations, an intention by the HEW station to transmit on the same selected sub-channel during the access period. In some examples, the transmission of the access signal may indicate, to the AP, a request by the HEW station for data transmission resources during the data transmission period.

In some examples, the determination of the transmission activity during the first portion may include detection of one or more announcement signals transmitted by other HEW stations. In some examples, the determination of the transmission activity during the first portion may include determination of transmission activity for each sub-channel of the group of sub-channels. In some examples, the channel sensing period may be divided into multiple time slots and the first and second portions of the channel sensing period may include one or more time slots. In some examples, each time slot of the channel sensing period may span a time duration less than ten percent of a time duration spanned by the access period.

In some examples, the second portion of the channel sensing period may include a contiguous group of time slots. A starting time slot of the second portion may immediately follow a final time slot of the first portion. A final time slot of the second portion may be a final time slot of the channel sensing period. In some examples, the starting time slot of the second portion may be selected randomly from the time slots included in the channel sensing period. In some examples, the first portion of the channel sensing period may be restricted to a single time slot.

In some examples, the hardware processing circuitry may be further configured to receive, from the AP, a contention trigger signal that indicates timing for the channel sensing period and a data trigger signal that includes data transmission allocations for the data transmission period. In some examples, the hardware processing circuitry may be further configured to transmit one or more uplink data signals during the data transmission. The uplink data signals may include one or more orthogonal frequency division multiple access (OFDMA) signals. In some examples, the announcement signal may include a short training field (STF) and a long training field (LTF) and may exclude identifiers of the HEW station. In some examples, the HEW station may further comprise one or more antennas configured to transmit the announcement signal and the access signal.

An example method for communication performed by a high-efficiency Wi-Fi (HEW) station is also disclosed herein. The method may comprise receiving, from an access point (AP), a contention trigger signal that indicates timing for a channel sensing period. The method may further comprise determining one or more unused sub-channels from a group of sub-channels. The determination may be based on detection of announcement signal transmissions from other HEW stations during a first portion of the channel sensing period. The method may further comprise selecting one of the unused sub-channels randomly and transmitting an announcement signal on the selected sub-channel during a second portion of the channel sensing period. The method may further comprise transmitting an access signal on the selected sub-channel during an access period subsequent to the channel sensing period. The access signal may include an identifier for the HEW station.

In some examples, the sub-channels may comprise a predetermined bandwidth and may further comprise multiple sub-carriers. In some examples, the channel sensing period and the access period may be allocated for resource contention by HEW stations for data transmissions to the AP on the group of sub-channels during a data transmission period. In some examples, the method may further comprise receiving a data trigger signal that includes a data transmission allocation of one or more sub-channels for the data transmission period and transmitting one or more orthogonal frequency division multiple access (OFDMA) data signals to the AP on the sub-channels indicated in the data trigger signal. In some examples, the data signals may be transmitted on a sub-channel different from the sub-channel used for transmission of the announcement signal.

In some examples, the channel sensing period may be divided into multiple time slots. The first and second portions of the channel sensing period may include one or more time slots and each time slot of the channel sensing period may span a time duration less than ten percent of a time duration spanned by the access period. The announcement signal may exclude identifiers for the HEW station. In some examples, the second portion of the channel sensing period may include a contiguous group of time slots and a starting time slot of the second portion may be selected randomly from the time slots included in the channel sensing period. The starting time slot of the second portion may immediately follow a final time slot of the first portion. A final time slot of the second portion may be a final time slot of the channel sensing period. In some examples, the first portion of the channel sensing period may be restricted to a single time slot.

An example non-transitory computer-readable storage medium is also disclosed herein. The non-transitory computer-readable storage medium may store instructions for execution by one or more processors of a high-efficiency WiFi (HEW) station to perform operations for communication. The operations may configure the one or more processors to, during a first portion of a channel sensing period, determine transmission activity for a group of sub-channels. The operations may further configure the one or more processors to, during a second portion of the channel sensing period, transmit an announcement signal on a sub-channel selected from the group of sub-channels. The selection may be based at least partly on the transmission activity during the first portion. The operations may configure the one or more processors to, during an access period, transmit an access signal on the same sub-channel selected for the transmission of the announcement signal. The access signal may include an identifier of the HEW station. The channel sensing period and the access period may be allocated for resource contention by HEW stations for data transmissions to an access point (AP) on the group of sub-channels during a data transmission period. In some examples, the selection of the sub-channel for the transmission of the announcement signal may be based on a random selection from one or more sub-channels on which transmission activity is not determined during the first portion.

An example high-efficiency Wi-Fi (HEW) access point (AP) is also disclosed herein. The HEW AP may comprise hardware processing circuitry configured to transmit a contention trigger signal that indicates timing for an access period for an uplink random access contention by multiple HEW stations. The hardware processing circuitry may be further configured to receive a first access signal from a first HEW station during a first access time slot of the access period on a first sub-channel. The hardware processing circuitry may be further configured to receive a second access signal from a second HEW station during a second access time slot of the access period on the same first sub-channel. The hardware processing circuitry may be further configured to transmit a data trigger signal that includes data allocations for the first and second HEW stations for transmission of uplink data signals during a data transmission period. The data allocation for the first HEW station may include the first sub-channel and the data allocation for the second HEW station may exclude the first sub-channel. In some examples, the hardware processing circuitry may be further configured to receive, according to the data allocations, one or more uplink data signals from the first and second HEW stations during the data transmission period. In some examples, the HEW AP may further comprise one or more antennas configured to transmit the contention trigger signal and the data trigger signal and to receive the first and second access signals. In some examples, the sub-channels may comprise a predetermined bandwidth and may further comprise multiple sub-carriers.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) station comprising:
    memory; and,
    hardware processing circuitry coupled to the memory, the hardware processing circuitry configured to:
    during a first portion of a channel sensing period, determine transmission activity for a group of sub-channels wherein the group of sub-channels are orthogonal and comprise a predetermined bandwidth and further comprise multiple sub-carriers for orthogonal frequency division multiple-access (OFDMA) transmissions;
    select a sub-channel from the group of sub-channels, the selection based at least partly on the transmission activity during the first portion;
    during a second portion of the channel sensing period, configure the HE station to transmit an announcement signal on the sub-channel selected from the group of sub-channels; and
    during an access period, configure the HE station to transmit in accordance with OFDMA an access signal on the sub-channel selected for the transmission of the announcement signal, wherein the access signal includes an identifier of the HE station, wherein the channel sensing period and the access period are allocated for resource contention by HE stations for data transmissions to an access point (AP) on the group of sub-channels during a data transmission period.

2. The apparatus of the HE station according to claim 1, wherein the sub-channel used for the transmission of the announcement signal is selected randomly from one or more sub-channels of the group of sub-channels on which transmission activity is not detected during the first portion.

3. The apparatus of the HE station according to claim 1, wherein:
    the transmission of the announcement signal on the selected sub-channel is to indicate, to other HE stations, an intention by the HE station to transmit on the selected sub-channel during the access period; and
    the transmission of the access signal indicates, to the AP, a request by the HE station for data transmission resources during the data transmission period.

4. The apparatus of the HE station according to claim 1, wherein the determination of the transmission activity during the first portion includes detection of one or more announcement signals transmitted by other HE stations.

5. The apparatus of the HE station according to claim 1, wherein the determination of the transmission activity during the first portion includes determination of transmission activity for each sub-channel of the group of sub-channels.

6. The apparatus of the HE station according to claim 1, wherein the channel sensing period is divided into multiple time slots and the first and second portions of the channel sensing period include one or more time slots.

7. The apparatus of the HE station according to claim 6, wherein each time slot of the channel sensing period spans a time duration less than ten percent of a time duration spanned by the access period.

8. The apparatus of the HE station according to claim 6, wherein:
    the second portion of the channel sensing period includes a contiguous group of time slots, a starting time slot of the second portion immediately follows a final time slot of the first portion, and a final time slot of the second portion is a final time slot of the channel sensing period.

9. The apparatus of the HE station according to claim 8, wherein the starting time slot of the second portion is selected randomly from the time slots included in the channel sensing period.

10. The apparatus of the HE station according to claim 9, wherein the first portion of the channel sensing period is restricted to a single time slot.

11. The apparatus of the HE station according to claim 1, the hardware processing circuitry further configured to decode, from the AP, a contention trigger signal that indicates timing for the channel sensing period and a data trigger signal that includes data transmission allocations for the data transmission period.

12. The apparatus of the HE station according to claim 11, the hardware processing circuitry further configured to configure the HE station to transmit one or more uplink data signals during the data transmission, wherein the uplink data signals include one or more orthogonal frequency division multiple access (OFDMA) signals.

13. The apparatus of the HE station according to claim 1, wherein the announcement signal includes a short training field (STF) and a long training field (LTF) and excludes identifiers of the HE station.

14. The apparatus of the HE station according to claim 1, the HE station further comprising one or more antennas configured to transmit the announcement signal and the access signal.

15. A method for communication performed by an apparatus of a high-efficiency (HE) station, the method comprising:
    decoding, from an access point (AP), a contention trigger signal that indicates timing for a channel sensing period;
    determining one or more unused sub-channels from a group of sub-channels, wherein the determination is based on detection of announcement signal transmissions from other HE stations during a first portion of the channel sensing period, wherein the sub-channels are orthogonal and comprise a predetermined bandwidth and further comprise multiple sub-carriers for orthogonal frequency division multiple-access (OFDMA) transmissions;

selecting one of the unused sub-channels randomly;

transmitting in accordance with OFDMA an announcement signal on the selected sub-channel during a second portion of the channel sensing period; and transmitting in accordance with OFDMA an access signal on the selected sub-channel during an access period subsequent to the channel sensing period, wherein the access signal includes an identifier for the HE station.

16. The method according to claim 15, wherein the channel sensing period and the access period are allocated for resource contention by HE stations for data transmissions to the AP on the group of sub-channels during a data transmission period.

17. The method according to claim 16, further comprising:
decoding a data trigger signal that includes a data transmission allocation of one or more sub-channels for the data transmission period; and
configuring the HE station to transmit one or more orthogonal frequency division multiple access (OFDMA) data signals to the AP on the sub-channels indicated in the data trigger signal.

18. The method according to claim 17, wherein the data signals are transmitted on a sub-channel different from the sub-channel used for transmission of the announcement signal.

19. The method according to claim 15, wherein:
the channel sensing period is divided into multiple time slots;
the first and second portions of the channel sensing period include one or more time slots;
each time slot of the channel sensing period spans a time duration less than ten percent of a time duration spanned by the access period; and
the announcement signal excludes identifiers for the HE station.

20. The method according to claim 19, wherein:
the second portion of the channel sensing period includes a contiguous group of time slots;
a starting time slot of the second portion is selected randomly from the time slots included in the channel sensing period;
the starting time slot of the second portion immediately follows a final time slot of the first portion; and
a final time slot of the second portion is a final time slot of the channel sensing period.

21. The method according to claim 20, wherein the first portion of the channel sensing period is restricted to a single time slot.

22. A non-transitory computer-readable storage medium that stores instructions for execution by one or more processors of an apparatus of a high-efficiency (HE) station to perform operations for communication, the operations to configure the one or more processors to:
during a first portion of a channel sensing period, determine transmission activity for a group of sub-channels, wherein the sub-channels are orthogonal and comprise a predetermined bandwidth and further comprise multiple sub-carriers for orthogonal frequency division multiple-access (OFDMA) transmissions;
select a sub-channel from the group of sub-channels, the selection based at least partly on the transmission activity during the first portion;
during a second portion of the channel sensing period, transmit an announcement signal on the sub-channel selected from the group of sub-channels; and
during an access period, transmit in accordance with OFDMA an access signal on the sub-channel selected for the transmission of the announcement signal, wherein the access signal includes an identifier of the HE station, wherein the channel sensing period and the access period are allocated for resource contention by HE stations for data transmissions to an access point (AP) on the group of sub-channels during a data transmission period.

23. The non-transitory computer-readable storage medium according to claim 22, wherein the selection of the sub-channel for the transmission of the announcement signal is based on a random selection from one or more sub-channels on which transmission activity is not determined during the first portion.

24. An apparatus of a high-efficiency (HE) access point (AP) comprising:
memory; and
hardware processing circuitry coupled to the memory, the hardware processing circuitry configured to:
configure the HE AP to transmit in accordance with orthogonal frequency division multiple-access (OFDMA) a contention trigger signal that indicates timing for an access period for an uplink random access contention by multiple HE stations;
decode in accordance with OFDMA a first access signal from a first HE station during a first access time slot of the access period on a first sub-channel;
decode in accordance with OFDMA a second access signal from a second HE station during a second access time slot of the access period on the first sub-channel; and
configure the HE AP to transmit in accordance with OFDMA a data trigger signal that includes data allocations for the first and second HE stations for transmission of uplink data signals during a data transmission period; wherein the data allocation for the first HE station includes the first sub-channel and the data allocation for the second HE station includes a second sub-channel, and wherein the first sub-channel and the second sub-channel are orthogonal and wherein the first sub-channel and the second sub-channel each comprise a predetermined bandwidth and further comprise multiple sub-carriers for OFDMA transmissions.

25. The apparatus of the HE AP according to claim 24, wherein the hardware processing circuitry is further configured to decode, according to the data allocations, one or more uplink data signals from the first and second HE stations during the data transmission period.

26. The apparatus of the HE AP according to claim 24, wherein the HE AP further comprising one or more antennas configured to transmit the contention trigger signal and the data trigger signal and to receive the first and second access signals.

* * * * *